United States Patent [19]
Clunis

[11] 3,882,366
[45] May 6, 1975

[54] MOTOR SPEED CONTROL SYSTEM
[75] Inventor: Kenneth Clunis, Stillwater, Minn.
[73] Assignee: Minnesota Mining and Manufacturing Company, Saint Paul, Minn.
[22] Filed: Nov. 5, 1973
[21] Appl. No.: 412,816

Related U.S. Application Data
[63] Continuation-in-part of Ser. No. 234,255, March 13, 1972, abandoned.

[52] U.S. Cl. ............... 318/326; 310/178; 318/253
[51] Int. Cl. ................... H02p 5/00; H02k 17/44
[58] Field of Search ........................ 310/178; 318/326–328, 253

[56] References Cited
UNITED STATES PATENTS

| | | | |
|---|---|---|---|
| 806,217 | 12/1905 | Wait | 310/178 |
| 3,333,130 | 7/1967 | Brouee | 310/178 |
| 3,383,578 | 5/1968 | Lewis | 318/326 |
| 3,465,187 | 9/1969 | Breaux | 310/178 |
| 3,513,340 | 5/1970 | Appleton | 310/178 |

Primary Examiner—Robert K. Schaefer
Assistant Examiner—John J. Feldhaus
Attorney, Agent, or Firm—Alexander, Sell, Steldt & DeLaHunt

[57] ABSTRACT

Precise motor speed control is achieved in a system wherein the speed of a bi-directional motor is controlled by a servo means in response to a homopolar tachometer-generator voltage signal that indicates the speed and direction of rotation of the motor. The homopolar tachometer-generator includes a conductor that is symmetrical about the axis of rotation of the motor and is coupled to the motor shaft to uniformly intersect a provided unipolar magnetic field. Two pair of stationary brushes contact the conductor and serve to furnish a substantially ripple free voltage signal.

10 Claims, 6 Drawing Figures

MOTOR SPEED CONTROL SYSTEM

CROSS-REFERENCE

This application is a continuation-in-part of application Ser. No. 234,255, filed Mar. 13, 1972 now abandoned.

BACKGROUND OF THE INVENTION

1. Field of the Invention

The present invention pertains in general to motor speed control systems wherein the speed of a bi-directional motor is controlled by a servo means in response to a voltage signal from a tachometer-generator. More specifically, the present invention is directed to a motor speed control system having a tachometer-generator capable of providing substantially ripple free voltage signals that indicate the speed and direction of the motor to enable precise motor speed control.

Various types of motor speed control systems are well known in the prior art and normally include a tachometer-generator that is coupled with the motor to provide a voltage signal indicative of the speed and direction of rotation of the motor. Such voltage signal is employed to determine whether the speed of the motor should be increased or decreased to operate at a desired speed.

A specific application of such a motor speed control system is in a magnetic recording tape cartridge drive system, wherein a bi-directional motor drives the tape contained within a cartridge. When tape cartridges are used in a digital signal recording system, the motor must be capable of rapid acceleration, such as 1,000 RPM per 10 milliseconds, and of being precisely controlled during such rapid acceleration as well as thereafter. The problem has been to provide precise control during such short periods of rapid acceleration. At the root of this problem is the difficulty experienced in obtaining a ripple free voltage signal from the tachometer-generator.

One prior art method of generating the tachometer signal employs an AC device, such as an AC alternator, or a segmented disk with a photoelectric pickup. However, in order to provide the necessary speed of response, a large number of segments (or poles, in the case of an AC alternator) per revolution are required. This number must be several hundred per revolution in order to meet the requirements of a tape cartridge drive system. In addition to the need for a large number of segments, AC tachometer devices are not inherently direction indicating, and therefore, additional sensors and a logic circuit must be added to enable an AC tachometer to be useful in this application.

Another prior art method of generating the tachometer signal employs a DC generator with a commutator and brushes. While such devices are relatively simple and are also inherently direction indicating, the commutator ripple is usually rather large (e.g., 7 to 15%). The resultant spurious variation in control voltage causes an undesired commensurate variation in the speed of the motor. Commutator ripple can be minimized if the number of poles and commutator segments are large, but this increases the cost.

SUMMARY OF THE INVENTION

I have discovered that precise motor speed control may be obtained with a speed control system using a homopolar generator as the tachometer-generator. According to the present invention, the homopolar tachometer-generator comprises means for providing a unipolar magnetic field; a conductor coupled to the motor shaft for rotation in said magnetic field, which conductor is shaped and mounted to uniformly intersect the magnetic field at all rotational positions; and two pair of stationary brushes contacting the conductor at all rotational positions and electrically connected together in such fashion that they provide a substantially ripple free voltage signal indicative of the speed and direction of rotation of the motor.

Preferably, the conductor comprises either a Faraday disk or a cylinder. A cone-shaped conductor or any other type conductor which is shaped and mounted to uniformly intersect the magnetic field at all rotational positions may also be used. The brushes are electrically connected to form two pair, an inner pair and an outer pair that are positioned to substantially eliminate ripple in the voltage signal provided by the homopolar tachometer-generator.

Although the voltage signal provided by the homopolar tachometer-generator is generally weak, this presents no problem in this application since the voltage signal merely provides an indication of a sensed condition. Thus, the voltage signal provided by the tachometer-generator may be amplified prior to being utilized if a stronger signal is desired. Because the provided voltage signal is substantially free of commutator ripple, precise control of the motor speed during rapid acceleration is thereby achieved. Also, the homopolar tachometer-generator may be of simple construction and less expensive than conventional tachometer-generators.

The foregoing and other advantages of the present invention will appear from the following description. In the description reference is made to the accompanying drawings, which form a part hereof, and in which there is shown by way of illustration, and not of limitation, specific forms in which the invention may be embodied. Such embodiments do not represent the full scope of the invention, but rather the invention may be employed in a variety of embodiments, and reference is made to the claims herein for interpreting the breadth of the invention.

DESCRIPTION OF THE PREFERRED EMBODIMENTS

Figure 1:
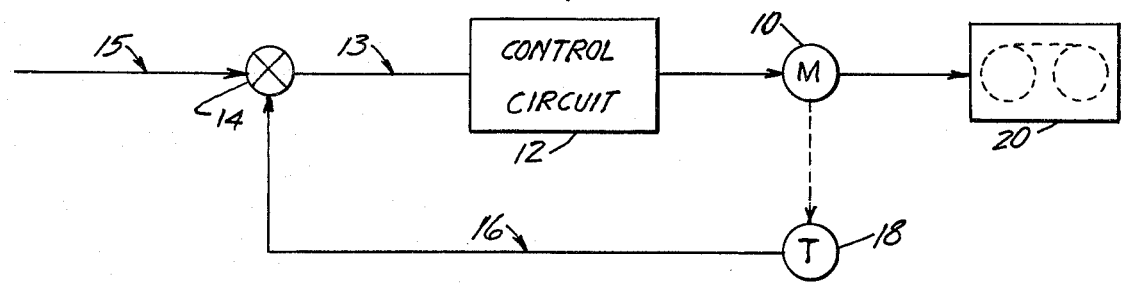
FIG. 1 is a block diagram of a motor speed control system common to both the prior art and the present invention.

Referring now to the drawings and with specific reference first to FIG. 1, a motor speed control system of the prior art is shown for controlling the speed and direction of rotation of a motor 10. In correlation with an error signal on a line 13, a control circuit 12 supplies the motor 10 with a drive signal. The error signal is produced by a differential means 14 through a comparison of a reference input provided on a line 15 and a voltage signal provided on a line 16. The voltage signal on the line 16 is indicative of the speed and direction of rotation of the motor 10 and is furnished by a tachometer-generator 18 coupled to the motor 10. One use for which such a control system may be employed particularly advantageously is the driving of tape contained in a cartridge 20 as shown.

Figure 2:
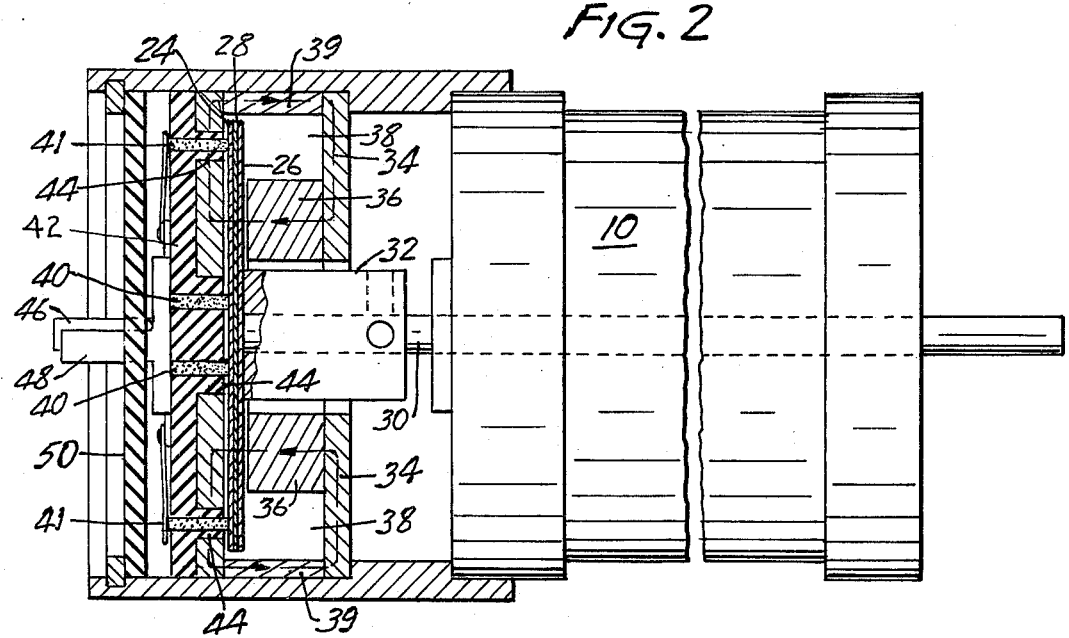
FIG. 2 shows a preferred embodiment of a homopolar tachometer-generator which, in accordance with the present invention, is included in a motor speed control system as shown in FIG. 1. In this embodiment, the homopolar tachometer-generator conductor is a Faraday disk.

The present invention employs the above described control circuitry, but deviates from the prior art by the use of a homopolar generator as the tachometer-generator 18. Referring now to FIG. 2 a first preferred embodiment of the homopolar tachometer-generator employed in the present invention is shown and includes a disk-shaped, silver conductor 24, approximately 5 mil (127 microns) thick. The conductor 24 constitutes a Faraday disk and is secured to one surface of an aluminum disk 26 by an approximately 1 mil (25.4 microns) thick lamination 28 of insulating epoxy adhesive. The aluminum disk 26 is coupled to a shaft 30 of the motor 10 by a hub 32 which is of integral construction with the aluminum disk 26.

A unipolar magnetic field 34, the direction of which is shown by the arrows indicating the field lines, is provided by a doughnut shaped permanent magnet 36. A chamber 38 defined by a soft steel housing 39 supports the magnet 36, and the conductor 24 uniformly intersects the field 34 at all rotational positions.

Two pair of silver carbon brushes 40 and 41 are supported by a molded plastic insulating structure 42 to protrude through holes 44 in the housing 39 and extend into the chamber 38. The structure 42 serves for positioning the brushes 40 and 41 in contact with the conductor 24, and the brushes 40 and 41 are spring biased against the conductor 24. The brushes 40 are both connected to a first electrical contact 46, and the brushes 41 are both connected to a second electrical contact 48. The electrical contacts 46 and 48 extend from the tachometer-generator structure 18 through a molded plastic insulation dust cover 50, and a voltage signal indicative of the speed and direction of rotation of the motor 10 is provided across the electrical contacts 46 and 48.

Figure 4:
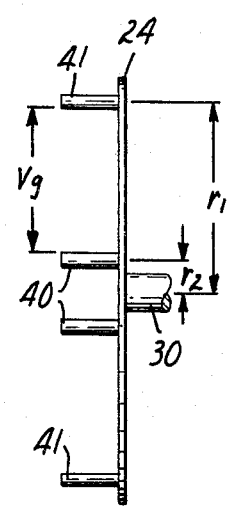
FIG. 4 is a diagrammatic view illustrating the arrangement of the brushes and conductor of the tachometer-generator shown in FIG. 2.

Typically, homopolar generators provide low ripple output signals. However, the homopolar generator of the present invention is an improvement over those of the prior art in that it is adapted to provide an output signal with substantially no ripple. The brushes 40 and 41 are radially positioned in the structure 42 so that the brushes 40 and 41 respectively form inner and outer pairs. One of the brushes 40, 41 from each pair is disposed to contact the conductor 24 at positions which are radially opposite from the other brushes 40, 41 of each pair, as seen in FIG. 4. In such positions, the voltage potentials across the brushes 40, 41 on each of the opposite sides of the shaft 30 are proportional to the speed of rotation of the conductor 24 multiplied by the difference between the square of the radial distances between the brushes 40, 41, and the center of the conductor 24, or as indicated in FIG. 4, $Vg = B^{\omega}/2 (r_1^2 - r_2^2)$ where $B$ is the magnetic flux density of the field 34 in which the conductor 24 is rotating.

Figure 5:
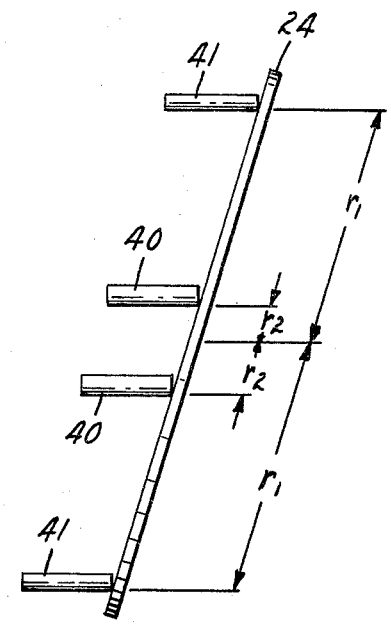
FIG. 5 is an enlarged diagrammatic view of the conductor and brush arrangement of FIG. 4 that depicts wobble of the conductor in an exaggerated fashion.

Because the voltage potential between the brushes 40, 41 on each side of the shaft 30 is proportional to the difference between the distances $r_1^2$ and $r_2^2$, it is necessary to employ two sets of the brushes 40 and 41, as will now be explained. To obtain voltage potentials of any significance, the rotational speed of the conductor 24 must be high. A consequent result of the high rotational speed of the conductor 24 is that it has a tendency to wobble on the shaft 30. As shown in the diagrammatic view of FIG. 5, wobble of the conductor 24 varies its contact with the pairs of brushes 40 and 41. As one side of the conductor 24 wobbles in a direction away from the brushes 40, 41, only the inner edges of the brushes contact that side. Concurrently, the opposite side of the conductor 24 moves in a direction toward the brushes 40, 41 to engage the outer edges of the brushes contacting that side. Thus, the points of contact of the brushes 40, 41 on opposite sides of the shaft 30 are not the same and the voltage potential existing across the brushes 40, 41 on each side of the shaft 30 varies between minimum and maximum levels.

If the brushes 40, 41 were located on only one side of the shaft 30 the voltage output of the homopolar tachometer-generator would have relatively considerable ripple. But by the use of the brushes 40, 41 on each side of the shaft 30, ripple in the tachometer output is substantially decreased because at the time the voltage across the brushes 40, 41 on one side is at a maximum level, the voltage across the brushes 40, 41 on the opposite side is at a minimum. Summing of the voltages across the brushes 40, 41 on both sides of the shaft 30 compensates for such voltage variation.

Figure 6:
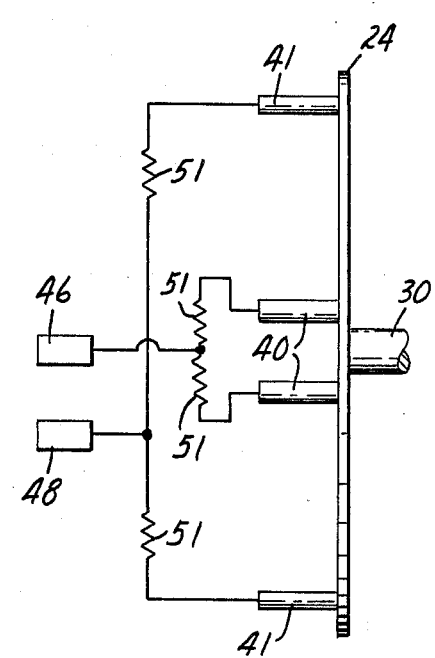
FIG. 6 is a schematic view of the electrical circuitry that connects the brushes of FIG. 4 in pairs.

A further decrease in the output signal ripple of the homopolar tachometer-generator may be achieved by connecting resistive means 51 between the inner brushes 40 and the contact 46 and between the outer brushes 41 and the contact 48, as depicted in FIG. 6. The purpose of the resistive means 51 is to stabilize the value of the resistance that exists in the electrical paths between the conductor 24 and the contacts 46 and 48. Without the addition of the resistive means 51 the resistance between the conductor 24 and the contacts 46 and 48 is dependent on the contact resistance between the brushes 40 and 41 and the conductor 24. Such contact resistance varies due to numerous factors; because the resistance is relatively small, increases or decreases therein will act to increase the ripple in the output voltage across the brushes 40 and 41. By the addition of the resistive means 51, which should each be preferably at least twenty times greater than the maximum contact resistance, the effect of variation in the contact resistance is substantially eliminated.

Figure 3:
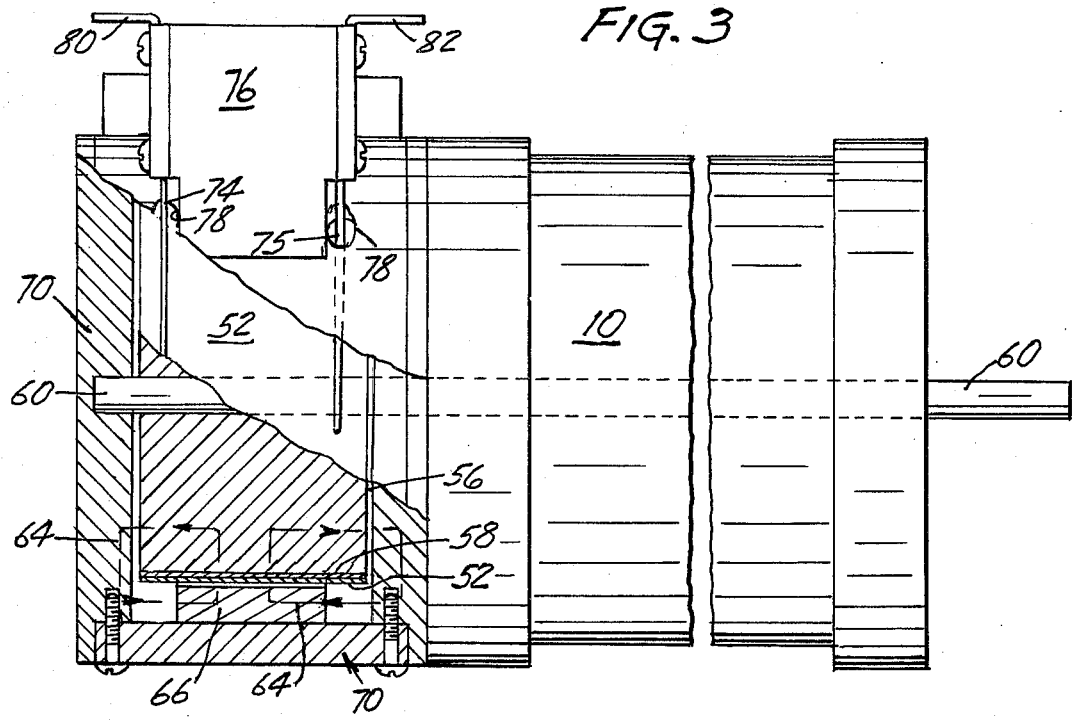
FIG. 3 shows another preferred embodiment of a homopolar tachometer-generator which, in accordance with the present invention, is included in a motor speed control system as shown in FIG. 1. In this embodiment, the homopolar tachometer-generator conductor is cylindrical.

Referring now to FIG. 3, a second preferred embodiment of the homopolar generator employed in the present invention is shown and includes a cylindrical conductor 52 formed of approximately a 5 mil (127 microns) thick, silver coating secured to the outer surface of a soft steel drum 56. Approximately a 1 mil (25.4 microns) thick layer 58 of insulating epoxy adhesive secures the conductor 52 to the drum 56, which, in turn, is coupled to a shaft 60 of the motor 10.

A unipolar magnetic field 64 is provided by a ring-shaped permanent magnet 66 supported on the inner surface 68 of a closed cylindrical soft steel housing 70. The direction of the magnetic field 64 is shown by the arrows indicating the field lines.

Brushes 74 and 75 are supported by a molded plastic insulating structure 76, which is secured to the outside of the housing 70. The brushes 74 and 75 extend through holes 78 in the housing 70 and contact the conductor 52. A voltage signal indicative of the direction and speed of rotation of the motor 10 is provided across electrical contacts 80 and 82, which are connected to the brushes 74 and 75 respectively. Although only two brushes 74 and 75 are shown, preferably two pairs of brushes 74 and 75 should again be employed to compensate for wobble of the conductor 52, with one brush of each pair located on opposite sides of the shaft 60. Also, resistive means may be employed in the electrical paths between the brushes 74 and 75 and the contacts 80 and 82 respectively to optimize reduction in the ripple of the output voltage.

What is claimed is:

1. A servo system that provides precise motor speed control of a bi-directional motor and comprises:
    a control means for furnishing an electrical drive signal to said motor;
    a differential means for providing an error signal to said control means; and
    a homopolar generator serving as a tachometer for providing a signal indicative of the speed and rotation of the motor to said differential means and having:
      means for providing a unipolar magnetic field;
      a conductor coupled to the shaft of the motor for rotation in said magnetic field to uniformly intersect said field at all rotational positions; and
      at least two pair of stationary brushes for providing a signal to said differential means, which brushes include an outer pair electrically contacting the outside portion of one side of said conductor and an inner pair electrically contacting the inside portion of the same one side of said conductor, and the brushes of said outer pair are electrically connected together and the brushes of said inner pair are electrically connected together but one of the brushes from each pair is disposed to contact said conductor at a position radially opposite from the other brush of the pair in order that the output signal provided by said generator is substantially ripple free.

2. A motor speed control system according to claim 1, wherein the conductor comprises a Faraday disk.

3. A motor speed control system according to claim 1, wherein the conductor comprises a cylinder.

4. A motor speed control system according to claim 1, wherein a resistive means is connected between each brush of said generator and said differential means to compensate for variation in the contact resistance between said brushes and said conductor.

5. A motor speed control system according to claim 4, wherein said resistive means is equal to at least 20 times the contact resistance between said brushes and said conductor.

6. A tape drive system wherein the tape is driven by a bi-directional motor, the speed of which is precisely controlled by a servo system that comprises:
    a control means for furnishing an electrical drive signal to said motor;
    a differential means for providing an error signal to said control means; and
    a homopolar generator serving as a tachometer for providing a signal indicative of the speed and rotation of the motor to said differential means and having:
      means for providing a unipolar magnetic field;
      a conductor coupled to the shaft of the motor for rotation in said magnetic field to uniformly intersect said field at all rotational positions; and
      at least two pair of stationary brushes for providing a signal to said differential means, which brushes include an outer pair electrically contacting the outside portion of one side of said conductor and an inner pair electrically contacting the inside portion of the same one side of said conductor, and the brushes of said outer pair are electrically connected together and the brushes of said inner pair are electrically connected together but one of the brushes from each pair is disposed to contact said conductor at a position radially opposite from the other brush of the pair in order that the output signal provided by said generator is substantially ripple free.

7. A tape drive system according to claim 6, wherein the conductor comprises a Faraday disk.

8. A tape drive system according to claim 6, wherein the conductor comprises a cylinder.

9. A tape drive system according to claim 6, wherein a resistive means is connected between each brush of said generator and said differential means to compensate for variation in the contact resistance between said brushes and said conductor.

10. A tape drive system according to claim 9, wherein said resistive means is equal to at least 20 times the contact resistance between said brushes and said conductor.

* * * * *